United States Patent [19]
Fusetti

[11] 4,020,825
[45] May 3, 1977

[54] FISHING ROD WITH HEATED HANDLE

[76] Inventor: Federico Fusetti, Via Buonamano 12, 6612 Ascona, Switzerland

[22] Filed: Aug. 25, 1975

[21] Appl. No.: 607,618

[30] Foreign Application Priority Data
Sept. 12, 1974 Switzerland ............... 12460/74

[52] U.S. Cl. .................... 126/206; 43/23
[51] Int. Cl.² .......................... A61F 7/06
[58] Field of Search ............ 126/204, 206, 208; 43/23

[56] References Cited
UNITED STATES PATENTS

| | | | |
|---|---|---|---|
| 1,475,163 | 11/1923 | Allport | 126/206 |
| 2,758,592 | 8/1956 | Phipps | 126/206 |
| 2,816,539 | 12/1957 | Church | 126/208 |
| 2,823,665 | 2/1958 | Steinbach | 126/204 X |
| 2,833,271 | 5/1958 | Barber | 126/208 |
| 2,835,245 | 5/1958 | Morgan | 126/208 |
| 2,997,042 | 8/1961 | Mitchell | 126/206 |
| 3,858,567 | 1/1975 | Slogaski | 126/206 |

Primary Examiner—Ronald C. Capossela
Attorney, Agent, or Firm—Young & Thompson

[57] ABSTRACT

A fishing rod has a hollow handle which is heated by combustion or chemical reaction. The handle has ventilating openings at both ends of the hollow therein; and a cylindrical container with plural longitudinally extending compartments receives fuel elements and is insertable in the handle. The ends of the container are perforated and one of them is removable. A sleeve is movable relative to the holes at one end of the handle to regulate the draft and hence the speed of fuel combustion.

4 Claims, 2 Drawing Figures

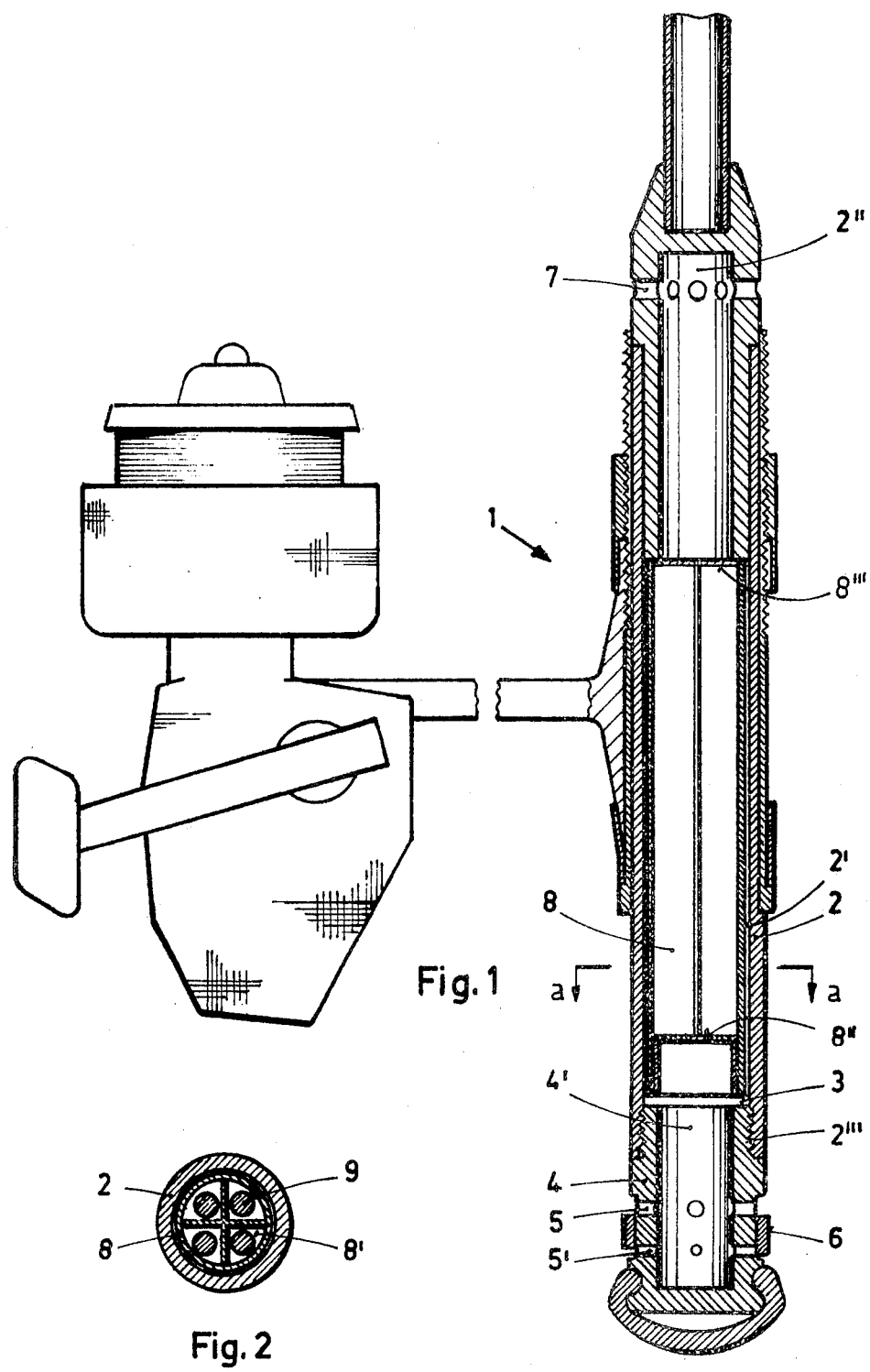

FISHING ROD WITH HEATED HANDLE

The present invention relates to fishing rods with heated handles.

One of the difficulties faced by those who fish with rods having metallic handles, is that the handle feels uncomfortably cold, particularly in winter or early in the day.

It has been proposed to obviate this inconvenience, by covering the handle with an insulating material such as cork. However, the results have not been entirely satisfactory; and moreover, the insulating coating has a tendency to come off easily.

Accordingly, it is an object of the present invention to provide a fishing rod having a handle which will be comfortably held even with bare hands on a cold day.

Another object of the present invention is the provision of a fishing rod having a heatable handle, which will be relatively simple and inexpensive to manufacture, easy to operate, and rugged and durable in use.

Briefly stated, the present invention comprises a fishing rod having a hollow heatable handle, in which a combustible fuel or exothermically reactive chemicals can be introduced through a closable opening, with means to regulate the rate of heat generation.

Other objects, features and advantages of the present invention will become apparent from a consideration of the following description, taken in connection with the accompanying drawing, in which:

FIG. 1 is a view of the handle end of a fishing rod according to the present invention, with attached reel, with the heatable handle shown in axial cross section; and FIG. 2 is a cross-sectional view taken on the line a—a of FIG. 1.

Referring now to the drawing in greater detail, and first to FIG. 1 thereof, there is shown a fishing rod according to the present invention, having a handle generally indicated at 1, and comprising a cylindrical metal sleeve-like member 2 that has an inner cylindrical cavity 2', a closed inner end 2'', and screw threads 2''' on the interior of its open outer end 3. An externally screw-threaded plug 4 screws into screw threads 2''' and has a hollow interior 4' that communicates with the interior of member 2 and that communicates with the surrounding atmosphere through holes 5, 5' through the side walls of plug 4. A ring 6 has a knurled outer surface and is slidable axially on plug 4 selectively to open and close the openings 5 and 5', which for this purpose may be of different sizes so as to provide regulable draft.

At the closed end 2'' of cavity 2', the handle of the fishing rod is provided with through holes 7, so that air may circulate from holes 5, 5' through the hollow interior of the handle and out through holes 7, or vice versa.

A cylindrical container 8 can be slipped into cavity 2'; and as best seen in FIG. 2, container 8 is divided into a plurality of compartments 8' by longitudinally extending partitions. Each compartment 8' is adapted to receive a solid fuel element 9 in the form of an elongated bar which may be of the slow burning or punking type. Alternatively, fuel elements 9 can be replaced by exothermically reactive chemicals (not shown) whose slow admixture results in a progressive exothermic chemical reaction.

The outer end of container 8 is closed by a removable closure in the form of a perforated cover 8''; while the inner end of container 8 is closed by a perforated end wall 8'''.

To use the device, the plug 4 is removed by unscrewing it and the container 8 is slid out through open end 3. The cover 8'' is then removed, and bars of solid fuel 9 are inserted in the compartments 8' of container 8 and ignited. Cover 8'' is then replaced to its FIG. 1 position and container 8 is inserted in the open hollow handle to the FIG. 1 position shown. The plug 4 is then screwed back in.

Air can thus circulate slowly between holes 5 and 7 in either direction, in a quantity sufficient to support slow combustion or punking of the fuel elements 9.

To regulate the quantity of this circulating air, the sleeve 6 can be adjusted relative to the holes 5 and 5'. It will of course be understood that the greater the total area of the holes 5, 5' that is exposed, the faster the fuel will burn and the hotter will be the handle. Instead of being slidable, the sleeve 6 can be screw-threadedly disposed on plug 4.

The slow burning solid fuel elements 9 are well known and can be any of those commercially available for this purpose.

From a consideration of the foregoing disclosure, therefore, it will be evident that all of the initially recited objects of the present invention have been achieved.

Although the present invention has been described and illustrated in connection with preferred embodiments, it is to be understood that modifications and variations may be resorted to without departing from the spirit of the invention, as those skilled in this art will readily understand. Such modifications and variations are considered to be within the purview and scope of the present invention as defined by the appended claims.

What is claimed is:

1. A fishing rod having an elongated hollow handle, a removable container in the handle, heating means in the removable container, means to close the end of the hollow handle thereby to retain the container in the handle, the handle having ventilating openings at opposite ends thereof disposed on opposite sides of said container thereby to permit air to reach the fuel, and means to adjust the total area of said openings thereby to regulate the amount of air reaching said fuel to control the heat emitted by said fuel, some of said openings being larger than others of said openings, said adjusting means comprising means movable axially of the handle to expose said larger openings in one axially adjusted position of said adjusting means and to close said larger openings and expose said other openings in another axially adjusted position of said adjusting means.

2. A fishing rod as claimed in claim 1, said adjusting means comprising a sleeve that entirely encompasses the handle and that is exposed to contact with the fingers so as to move the sleeve axially of the handle.

3. A fishing rod having an elongated hollow handle, heating means in the removable container, means to close the end of the hollow handle thereby to retain the container in the handle, and means to regulate the amount of heat emitted by said heating means, said heating means comprising a combustible fuel, the handle having ventilating openings at opposite ends thereof disposed on opposite sides of said container thereby to permit air to reach the fuel, said container having perforated opposite ends, one of said ends of said container being removable for insertion of said fuel.

4. A fishing rod as claimed in claim 3, and longitudinal partitions subdividing said container into a plurality of compartments for the reception of solid fuel.

* * * * *